United States Patent Office 2,917,426
Patented Dec. 15, 1959

2,917,426

FELTED PRODUCTS AND PROCESSES CONTAINING FIBROUS BOEHMITE

John Bugosh, Wilmington, Del., assignor to E. I. du Pont de Nemours and Company, Wilmington, Del., a corporation of Delaware No Drawing. Application September 26, 1958
Serial No. 763,428

20 Claims. (Cl. 162—145)

This invention relates to felted products and to processes for preparing the same.

This application is a continuation-in-part of U.S. patent applications, Serial Nos. 259,123, filed November 30, 1951, now abandoned; 331,122, filed January 13, 1953, now abandoned; 357,624, filed May 26, 1953, now abandoned.

More particularly, this invention is directed to felted products containing incorporated therein fibrous alumina monohydrate having the boehmite crystal lattice, and to processes for preparing such products. It has now been discovered that fibrous alumina monohydrate makes a new and useful binder for felted products resulting in new felted products having a variety of useful and frequently superior properties. These new felted products contain an amount of fibrous boehmite ranging from as little as a fraction of one weight percent up to about 99 weight percent of the total product weight.

FELTED PRODUCTS

The term "felted products" does not include those products which are made by weaving fibers together so as to form a fabric or fabric-like material, and it does not include those products which are cast or molded from homogeneous, uniform, generally fluid or fluidized composition. Rather, the term "felted products" is used in its customary sense to have reference to products generally prepared from natural or synthetic fibers which have a sheet or sheet-like form. Felted products can be formed from organic, inorganic, or mixed organic and inorganic starting materials. The fiber component in felted products can be of almost any sort. It can be synthetic or natural in origin. It can also be a film-forming or mat-forming material such as is conventionally used in the manufacture of felted products.

Thus, felted products are prepared from organic fibers including wood such as wood pulp, cotton, and other cellulosic fibers, silk, ramie, hemp, alpaca, camel hair, fur, goat hair, horse hair, and animal bristles, generally.

Synthetic organic fibers used as starting materials to prepare felted products including nylon polyamide fibers, "Orlon" (a Du Pont trademark) acrylic fibers and other acrylic-based fibers, "Dacron" (a Du Pont trademark) polyester fibers, cellulose acetate, regenerated cellulose (rayon), polyvinyl chloride, polyethylene, polyurethane, "Teflon" (a Du Pont trademark) polytetrafluoroethylene, and the like.

Natural inorganic fibers used as starting materials for felted products include all naturally occurring mineral fibers, especially asbestos and related silicate fibers.

Synthetic inorganic fibers suitable as starting materials in the manufacture of felted products include such items as glass fibers, aluminosilicate fibers, amorphous silicious fibers, fibers of potassium titanate, mineral fibers made from molten rock such as those commonly called rock wool, asbestos fibers and others. Also included in this general grouping are film-forming or mat-forming plate-like materials such as mica, exfoliated mica, vermiculite, flaked glass or the like. Such plate-like materials can be used either alone or in combinations with fibers. In general, any natural or synthetic inorganic fiber containing compounds of silicon, aluminum or titanium, such compounds being present in a particular fiber either singly or in combination with each other can be used to make the felted products of this invention. Such inorganic fibers are referred to hereinafter as silicious, titaniferous and aluminiferous fibers.

In general, the fibers used in felted products range in length from a few millimeters to several inches and range in width or thicknesses of a few millimicrons to several thousandths of an inch. Their exact dimensions are not critical to the use of fibrous boehmite. The fibers used in any given product will be selected by those skilled in the art from a consideration of the properties in the finished felted product. Mixtures of various fibers and plate-like materials can be used to make any particular felted product. In general, the amount of fiber in any given felted product can range from about 1.0 percent to about 99 percent by weight based on the total weight of product, although as those skilled in the art will readily appreciate, more or less than this amount of fiber can be used in a particular product depending upon the circumstances.

A number of different kinds of binders are conventionally used in the manufacture of felted products. Such binders can also be used when fibrous boehmite is introduced into felted products. Conventional organic binders include organic resins. Examples of organic resins include urea-formaldehyde, phenol-formaldehyde, melamine-formaldehyde resins and the like. Other polymers which are conventionally used as binders include polyvinyl acetate, ethylene/vinyl acetate and vinylchloride/vinyl acetate copolymers/polyvinyl alcohol, and other vinyl polymers known to the art of felted products.

Inorganic binders similarly can be used with fibrous boehmite. Examples of such inorganic binders include sodium silicate and other glass-forming silicious materials, low-melting borate glasses and also other well known inorganic binders especially those used in the binding of inorganic fibers which are subsequently to be used at elevated temperatures.

Examples of miscellaneous types of binders which can be used in felted products containing fibrous boehmite include such items as starch, clays, casein, animal glues and other similar glues, dextrin, synthetic rubbers of butadiene copolymer type such as butadiene/styrene, butadiene/acrylonitrile, butadiene/vinylpyridine copolymers, neoprenes, polyisobutylenes, isobutylene/isoprene (Butyl) rubbers and the like, natural rubbers, guar gum, gum arabic, and the like.

In such binder combinations the amount of fibrous alumina monohydrate having the boehmite crystal lattice can range from as little as 1 percent or even less up to 99 percent of the binder composition. The amount of fibrous boehmite used in any composition is dependent upon a number of variables and no precise figures can be given which will satisfy every particular use situation. As a particular specific example, a binder combination one might use in making felted products could consist of 1 part polyvinylacetate (sold under the Du Pont trademark "Elvacet") plus 1 part fibrous boehmite, said combination being incorporated into an aqueous dispersion having a total solids content of 25 weight percent. Of course, other ratios of fibrous boehmite to other binder component or components can be employed, since the total amount of fibrous boehmite used in a binder can vary over a wide range as just noted.

Actually, in any given felted products containing fibrous boehmite, the amount of fibrous alumina monohydrate having the boehmite crystal lattice can range over a very wide range as noted.

In felted products there are sometimes used a number of filters and bulking agents, especially in the manufacture of paper-like products and fur felts. Such conventional fillers can also be used in felted products containing fibrous boehmite. Such conventional fillers include a number of materials such as various clays such as china clay, calcium carbonates, titania, barium sulfate, carbon black, graphite, silica, diatomaceous earth, calcium silicates, fine particle size alumina trihydrate such as Bayer hydrate, gibbsites, and corundum. In general, the amount of filler used in a felted product may range up to 50 percent by weight of such product, although those skilled in the art might choose to put in more or less depending upon the particular use situation involved. The minimum amount of filler in the manufacture of felted products can range from fractions of 1 percent down to vanishingly small quantities or none there being no lower limit on the amount of such fillers which can be used in felted products containing fibrous boehmite.

The wet and dry strength of felted products containing fibrous boehmite, whether containing organic, inorganic or mixed fibers will be increased by the inclusion of low molecular weight colloidal silica together with fibrous boehmite into the products.

Generally, such colloidal silica particles do not have diameters in excess of about 10 millimicrons but they can range up to 200 millimicrons or even larger in diameter. The colloidal silica particles can be substantially pure silicon dioxide or alternatively, they can be modified by the presence of other materials chemically bound to or adsorbed upon the surfaces of the particles. The silica particles can be discrete or agglomerated.

Some types of substantially pure silicon dioxide particles can be readily dispersed in both organic and inorganic fluids. Thus, fumed silicas like "Cab-O-Sil," a submicroscopic particulate very pure silica prepared in a hot gaseous environment by the vapor phase hydrolysis of a silicon compound, can be dispersed in a fluent carrier.

Similarly, micronized silica gels can be dispersed in aqueous or non-aqueous fluent carriers. Unmodified, substantially pure silicon dioxide particles can be most readily dispersed in aqueous media.

To promote dispersions of silica particles in organic media, the silicon dioxide particles can be treated with other materials. Thus, the particles can be surface esterified or have chemicals adsorbed upon their surfaces. The silica particles can have adsorbed upon their surfaces a long chain, substituted, quaternary, ammonium ion. The preparation of such silica particles is more particularly described in Iler U.S. Patent No. 2,692,863. Such colloidal particles form true organosols and have average diameters ranging from about 5 to 100 millimicrons.

When surface esterified, discrete silicon dioxide particles are use, the particles are dispersed in organic liquid media as true organosols. These materials are described in R. K. Iler's U.S. Patent No. 2,657,149. See also Iler's U.S. Patent No. 2,801,185.

The preferred silica particles for use in the compositions of this invention containing colloidal silica are those silica particles which form true aquasols. Most preferred silicas are those which form stable aquasols when colloidally dispersed in an aqueous fluent carrier. By the word "stable" is meant that the sols are stable towards gelation or settling for periods of time in excess of one year. A preferred average diameter for the silica particles in such sols is from about 5 to 60 millimicrons.

Particularly advantageous aquasols are those of the Bechtold and Snyder U.S. Patent No. 2,574,902. Ordinarily these sols contain about 30 percent by weight of $SiO_2$ as they are sold in commerce and they can be diluted to whatever extent desired for use in the processes of the invention. The particle size of such sols will ordinarily be about 15 millimicrons in diameter, although sols can be made according to the processes of that patent with particles ranging in diameter up to the limits of colloidal dimension. The $SiO_2:Na_2O$ weight ratio of the sols will range upwardly from 60:1.

Other sols which can be used are those produced by one or more methods shown and described in the following patents: Rule, U.S. Patent No. 2,577,485; Alexander U.S. Patent No. 2,750,345; Bird U.S. Patent No. 2,344,325; Voorhees U.S. Patent No. 2,457,971; Reik U.S. Patent No. 2,423,178; Broughten U.S. Patent No. 2,535,036; White U.S. Patent No. 2,285,477; Marshall U.S. Patent No. 2,356,774; White U.S. Patent No. 2,375,738; Trail U.S. Patent No. 2,572,578; Trail U.S. Patent No. 2,573,743; and Legal, Jr. U.S. Patent No. 2,724,701.

When colloidal silica is used in felted products of the invention, usually not more than about 50 percent by weight of the boehmite bonded felt product will be silica. The silica used in felted products of this invention serves as a water-insolubilizing agent as well as a binder. The amount of colloidal silica used can vary within very wide ranges depending upon the type of particular product desired. The chief value of using colloidal silica in products of this invention is that it serves to cause insolubilization of the alumina component without recourse to a prolonged heating cycle during manufacture of a felted product.

In the preparation of various felted products containing fibrous boehmite, particular inert fillers or pigments are often included for the specific effects which they give. The fibrous boehmite serves to anchor such materials more effectively into the fiber felted product matrix.

FIBROUS ALUMINA MONOHYDRATE HAVING THE BOEHMITE CRYSTAL LATTICE

Solely as a matter of brevity, throughout this application the term "fibrous boehmite" will be used to refer to fibrous alumina monohydrate having the boehmite crystal lattice, such fibrous alumina having an axial ratio of at least 10:1.

Fibrous boehmite, itself, is in the form of well-formed and sharply-defined little fibers or fibrils. These fibrils have at least one dimension in the colloidal range and the fibril diameters in a particular product are usually quite uniform.

Fibrous boehmite can be prepared as a colloidal sol by heating an aqueous dispersion of certain aluminas under carefully controlled conditions in the presence of critical amounts of strong monobasic acids. The fibrous boehmite and processes for its preparation are described in detail, for example, in co-pending applications Serial Nos. 730,035, filed April 21, 1958, and 730,024, also filed April 21, 1958. A preferred fibrous boehmite is prepared according to the processes described in the above-noted co-pending application Serial No. 730,024. By following the procedure given in U.S. patent application Serial No. 730,026, filed April 21, 1958, it is possible to prepare redispersible powders of fibrous boehmite.

Fibrils of fibrous boehmite have an axial ratio of at least about 20:1, preferably. It is more specifically preferred that the axial ratio can be from about 50:1 to 150:1. The axial ratio can be as high as 300:1 or even higher. Preferred fibrous boehmite fibrils have an axial ratio which lies between about 60:1 and 80:1. Ordinarily the breadth and thickness of the fibril will be of the same order of magnitude and these dimensions will be less than about 15 millimicrons, but not much less than about 3 millimicrons. It is more specifically preferred that the diameter of fibrous boehmite fibrils be in the range of from about 3 to 10 millimicrons. Still more preferably, it is preferred to use starting fibrous boehmite fibrils in which average particle diameters range from about 4 to 7 millimicrons.

The length of fibrils of fibrous boehmite will generally be indicated from the ratios given above. More specifically, the fibrils are characterized by having lengths of from about 100 to 1500 millimicrons, as shown by electron micrograph measurements. Preferred fibrils have length on the average from about 100 to 700 millimicrons. More specifically, it is preferred that the fibrils of fibrous boehmite range from about 100 to 330 millimicrons. In speaking of particle size and shape, it will be understood that reference is made to the average fibril particle; that is, the average width of all such particles in a given sample or quantity of material, or by the same token the average length of all such particles in a given sample or quantity of materials.

The fibrous boehmite fibrils used in this invention are further defined by their specific area. Measurement of the specific surface area of the dry fibrous boehmite products provides an accurate and sensitive method for ascertaining the smaller two dimensions of the particles. The specific surface areas of the fibrils can be determined by nitrogen adsorption. In general, the fibrous boehmite fibrils can have specific surface areas ranging from about 100 to 400 square meters per gram ($m.^2/g.$). However, it is preferred to use fibrous boehmite fibers having specific surface areas ranging from about 200 to 400 $m.^2/g.$ Most preferred are fibrils having a specific surface area in the range of from about 250 to 350 $m.^2/g.$ Complete descriptions of the various techniques used for physically characterizing fibrous boehmite fibrils are given in, for example, the aforenoted U.S. patent applications relating to methods for the preparation of fibrous boehmite.

Fibrous boehmite, in addition to being dispersible in water, can be dispersed in organic solvents. A number of such solvents are described in U.S. application Serial No. 730,025, now abandoned.

While, as has been indicated, the fibrous boehmite used in the felt products in this invention can be in a dry state initially or in various forms or states of agglomeration, it is preferable for most purposes of the invention to use a fibrous boehmite dispersion in which the individual fibrils are agglomerated as little as possible. If the final felted product, such as say, an inorganic paper, is to be used in the electrical industry as an insulator in a condenser, it is desirable to use fibrous boehmite sols which have a very low ion content. This is not essential, however, since the ionic impurities can be removed from the felted product by thorough washing.

Fibrous boehmite sols prepared according to the teachings of U.S. patent application No. 730,025, now abandoned, may contain in addition to fibrous boehmite an acid radical which is generally associated with an aluminum ion or a basic aluminum ion. "Deionization" as used here refers to the removal of the acid radical, and in general, replacing it with a hydroxyl ion or alternatively removing the acid radical as the free acid, e.g., as HCl or acetic acid.

Strong acid radicals can be removed with an ion exchange resin, according to the teachings of U.S. Patent No. 2,733,205. They can also be removed as a salt by gelling the fibrous boehmite sol with a base and then filtering and washing until the salt of the strong acid radical is practically entirely removed. Preferably, the sol is gelled with concentrated $NH_4OH$ at a $pH=10$ while at 70 to 90° C., filtered hot and then washed with $pH=10$ water until anion free and then distilled $H_2O$. This deionized cake which generally contains from 5 to 15 percent $Al_2O_3$ can be reconstituted to an aqueous dispersion by agitating vigorously and if a more fluid dispersion is desired, a weak or strong monobasic acid can be added to lower the pH, e.g., to about 3.0 to 7.0.

Strong or weak acid radicals can also be removed from the aquasols by transferring the undeionized fibrous boehmite sols of U.S. patent application No. 730,025, now abandoned, to an organic liquid, e.g., butanol followed by azeotropic distillation to remove water and then heating this organosol above the critical point of the organic phase and venting off the organic phase and the acid radical as the free acid. In this way, dry, fluffy, fibrous boehmite can be made which has about 95 to 99 percent less acid radical than present in the aquasol. An especially preferred procedure for removal of weak acids such as acetic acid from fibrous aquasols is to spray dry.

Use of the deionized fibrous boehmite sols with inorganic fibers results in improved operability by decreasing formation time and improving uniformity of felted products as compared to boehmite sols which have not been deionized.

The amount of fibrous boehmite to use will vary widely, depending upon the specific felted product being treated and the magnitude of the effect desired. Generally, it may be said that the more fibrous boehmite is used, the higher the tensile strength that will be obtained, the lower the porosity and the lower the flexibility. For example, as little as 5 percent of fibrous boehmite based on the weight of glass fibers is enough to give a marked reinforcing effect and 50 percent or more of fibrous boehmite alumina produced a stronger, but less flexible and less porous, glass fiber paper. It will be understood that the invention is not limited to this amount of fibrous boehmite since very small amounts, say a fraction of a percent will have some effect and large amounts up to approaching 100 percent are still useful since the fibrous boehmite will itself form a sheet. There ordinarily should be enough of another and of course larger, fiber present to permit easy formation of a felted product.

As was earlier noted, the amount of fibrous alumina monohydrate having the boehmite crystal lattice used in any particular felted product of the invention can range from amounts as low as a fraction of 1 percent or even less up to 99 percent of the product.

PROCESS CONDITIONS

The preparation of a felted product incorporating fibrous boehmite can proceed, in general, in the way or ways already known to the art for the production of felted products not containing the fibrous boehmite. No notable change in manufacturing technique need be made beyond the addition of fibrous boehmite at a suitable or convenient point in manufacture.

Fibrous boehmite can be incorporated into a felted product in any of a variety of ways. One way, for example, in which it can be added to fibers before they are felted and while they are still dispersed into a slurry is to add the fibrous boehmite to the beater such as is conventionally used in the paper-making process. The fibrous boehmite, itself, might be dispersed in a compatible liquid or it may be in a dry form. Ordinarily, the fibers to be felted will be in an aqueous dispersion and usually an aqueous dispersion of fibrous boehmite will be a most convenient and suitable form for addition to the beater.

The fibrous boehmite can be incorporated into the felted product at later stages of manufacture. It can be added, for example, as a dispersion or a dry product to a wet sheet of felted product.

In all types of felted products, while the pH of the fibers to be felted using fibrous boehmite fibrils may vary widely, it is preferred, but by no means necessary, that the pH be slightly acidic because of the circumstance that fibrous boehmite fibers are better dispersed in an aqueous dispersion at a pH of from about 3 to 7.

Such pH may be adjusted to this range by sulfuric acid, hydrochloric acid, phosphoric acid, organic carboxylic acids, or other acidic materials and the acidic pH should be maintained right up to the point of fiber felting. For example, acid adjustment would be made in the beater and in the final dilution step prior to entering into the headbox of a paper machine.

By the addition of fibrous boehmite to fibers in aqueous dispersion, one obtains a valuable dispersing action from the fibrous boehmite.

A way of making the products of the invention relatively water insensitive is to incorporate a heat treatment step in the manufacture of the felted products. Thus, to make a felted product less sensitive to moisture a felted product can be heat treated after manufacture simply by heating such product to a temperature well in excess of the boiling point of water. Ordinarily, it will be necessary to use temperatures no higher than about 150° C. at atmospheric pressure although even higher temperatures can be used. Of course, one will not wish to use temperatures in excess of the point at which product deterioration occurs.

In summary, the preparation of the felted product incorporating fibrous boehmite can proceed in the ways already known to the art for the production of felted products without the use of fibrous boehmite. No notable change in the manufacturing technique need be made beyond the addition of fibrous boehmite at some suitable point in the manufacture of a felted product to the materials being felted.

FELTED PRODUCTS CONTAINING FIBROUS BOEHMITE AND CERTAIN OF THEIR CHARACTERISTICS

Felted products containing fibrous boehmite are stronger and can be made somewhat less flexible than comparable products not containing the fibrous boehmite.

Fibrous boehmite is especially unique in comparison with other inorganic colloids for use in felted products because of its bonding effectiveness. While all facts associated with its unusual bonding characteristics are not known with certainty, it is believed that its excellent film-forming ability when deposited on fiber surfaces used in the manufacture of felted products is in large measure responsible for its unusual bonding properties. This film-forming ability is related to the fibril dimensions and high cohesive forces between the fibrils as they are deposited and dried from fluid carriers. Such cohesion is believed to confer a high degree of adhesive strength which is not ordinarily achieved by other non-film-forming inorganic materials.

Furthermore, the fact that fibrous boehmite particles are positively charged enhances their bonding power since most fiber surfaces carry a negative charge at least with respect to the charge associated with the fibrous boehmite.

The high surface area and chemical reactivity associated with fibrous boehmite AlOOH crystal structure are also believed to contribute substantially to its effective bonding characteristics in felted products.

Felted products, such as various types of paper, can be used as filters and can be put into any of the numerous uses to which such types of paper and other felted products have previously been put. The inorganic and organic papers produced according to this invention are useful in the electrical industry in the manufacture of condensers. Conducting papers and boards may be made by the inclusion of graphite in boehmite bonded felted products by conventional papermaking techniques. Paper so produced from inorganic fibers such as glass fibers and not having any organic addition, is completely fireproof, mildewproof, verminproof, and in addition is stable towards heat and many common reagents.

Paper, paperboard, pasteboard, and similar felted products made from cellulosic fibers, such as woodpulp, are particularly well suited for modification in accordance with the present invention. Of course, such paper products may contain other fibrous materials in accordance with conventional practice and procedures. Such felted products may contain fibrous boehmite in amounts varying between 1% and 99% of the total, but preferred products will normally consist of between 5% and 50% fibrous boehmite.

Fibrous boehmite may be applied in the beater, particularly in combination with paraffin wax utilizing the fibrous boehmite as the dispersing agent.

Sizes for paper to be used either in the beater or in the size tub can be improved by the addition of fibrous boehmite, particularly where the latter is used as a dispersing agent in waxes, resins, elastomers or other sizing agents. Sizes of the type utilized to give improved wet strength, including phenol-formaldehyde emulsions and alkyd resin emulsions, are improved by the incorporation of fibrous boehmite.

The fibrous boehmite can be dispersed in a liquid medium and applied in either dilute or concentrated form and applied to paper according to methods with which the art is already familiar in connection with the application of sodium silicate and alum to paper. Thus, the sheet can be immersed in the dispersion or the dispersion can be applied from a transfer roll, by spraying or other mechanical applications. In the finished paper, the boehmite content will normally range from about 0.5 to 30 percent by weight, although as previously stated, larger or even smaller amounts may be employed depending on the properties desired.

In an especially preferred embodiment of the invention, fibrous boehmite is included in felted products and especially in inorganic paper, made from such inorganic fiber materials as glass fibers. These fibers usually have a range of diameter from about 0.03 to 2 microns. Magnesium silicate asbestos fibers bonded with fibrous boehmite are also preferred compositions, particularly for thermal and electrical insulation. Silica fibers such as "Refrasil" marketed by the H. I. Thompson Co. can also be used. A mineral fiber consisting of aluminosilicate with minor amounts of boron called "Fiberfrax" which is marketed by the Carborundum Co. makes very satisfactory inorganic paper or felted insulation material for modification according to the teachings of this invention. Rock or mineral wool fibers, made by blowing molten furnace slags containing lime and silicious materials with steam (see Hackh's Chemical Dictionary (1950), page 742) especially when freed of large particle size material, are also usable. Blown kaolin fibers such as those manufactured and marketed by Babcock and Wilcox Co. as "Kaowool" are also particularly well suited to bonding into felted products by fibrous boehmite. Excellent insulating papers and mat-like felts are made by bonding potassium titanate fibers prepared according to U.S. Patent 2,841,470. As previously indicated such inorganic felted products may contain amounts of fibrous boehmite varying from 1 percent to 99 percent of the total, but preferred papers, mats and other felted compositions consist of between 5 percent and 50 percent fibrous boehmite.

With inorganic fibers, particularly glass fibers, the use of sodium hexametaphosphate in conjunction with fibrous boehmite results in improved dispersion characteristics of the glass fibers and hence in superior product properties. Such inorganic paper felted products can be used as filters, as thermal or sound insulation materials or the like. In general, they can be used for any of the numerous applications to which such types of paper and other felted products have been previously put.

Also, in general, it can be said any of the additives hereinbefore employed in the manufacture of organic felted products can be used in conjunction with the fibrous boehmite when it is introduced into organic felted products during their manufacture.

In general summary, felted products of this invention can comprise from about 1 to 99 weight percent of fiber and from about 1 to 99 weight percent of fibrous boehmite. In addition, the products can contain from about 1 to 50 weight percent of filler. Binder combinations used in making these felted products can contain from about 1 to 99 weight percent of fibrous boehmite and from about 1 to 99 weight percent of another or other fibers.

Preferred felted products of this invention contain from about 5 to 50 weight percent of fibrous boehmite. Such preferred products have a fiber content of at least about 5 weight percent and usually the fiber content ranges from about 50 to 95 weight percent. Thus, preferred felted products can be described as comprising at least about 5 weight percent fibrous boehmite in combination with about 1 to 50 weight percent filler, the remainder up to 100 weight percent of such felted products consisting of binder, such binder containing from about 1 to 99 weight percent of fibrous boehmite.

In order that the invention may be better understood reference should be had to the following illustrative examples:

Example 1

A 1% aqueous suspension of glass fiber of a borosilicate type suitable for making a glass paper is used. The glass fibers have a diameter between 0.50 and 0.75 micron and are sold commercially as "Vitron" 106 microfibers.

The fibrous boehmite is used as an aquasol and is prepared as shown in my co-pending application Serial No. 730,025 above cited. Briefly a basic aluminum chloride solution containing an Al:Cl ratio of 6:3 is made up from aluminum metal and aluminum chloride. This solution is diluted to about 2% alumina and then heated for 4 hours at 160° C. This sol contains fibrous boehmite alumina particles having a specific surface area of about 290 m.$^2$/g. The sol produced contains about 16% of unpolymerized alumina essentially as $AlCl_3$ and has a pH of 3.02. The fibers in the sol have a diameter of about 5 millimicrons and lengths of about 1 micron.

To a 1% suspension of glass fibers there is added enough of the fibrous boehmite alumina sol to amount to 0.2 part by weight $Al_2O_3$ based upon the amount of glass fiber. The suspension thus prepared contains 10 parts by weight of glass fibers, 990 parts by weight of water and 2 parts by weight of $Al_2O_3$ as fibrous boehmite. The mixture is rapidly agitated for about 60 seconds.

The pH of the beaterstock composed of the glass fibrous alumina is 5.85.

The fibers are formed into a paper sheet on a conventional screen. The filtration time was 510 seconds under atmospheric pressure. The average thickness of the sheet is 11.6 mils with a range of 10.6 to 13.1 mils. The density of 0.278 gram/cc. while the porosity or air resistance is 52.3 Gurley seconds.

Example 2

A fibrous boehmite aquasol is prepared as described in Example 1. To a 1% suspension of glass fibers ("Vitron" 106) is added a small quantity of sodium hexametaphosphate ("Calgon") and the mixture is rapidly agitated for about 60 seconds. The pH of the mix is then reduced to 3 with dilute sulfuric acid and sufficient fibrous boehmite alumina sol of the type mentioned above added to give 0.2 part by weight of $Al_2O_3$ based upon the amount of glass fibers. The mixture is again rapidly agitated for 60 seconds. The suspension thus prepared contains 10 parts by weight of glass fibers, 990 parts by weight of water, 0.2 part by weight of sodium hexametaphosphate, 2 parts by weight of $Al_2O_3$ as fibrous boehmite, and sufficient dilute sulfuric acid for pH adjustment.

The fiber suspension is added to the headbox of a Noble and Wood laboratory sheet machine, the water in the headbox having been adjusted previously to a pH of 3 with dilute sulfuric acid. The fibers are formed on a conventional screen into a paper sheet weighing about 2.5 gms. The formation time is 203 seconds under atmospheric pressure. The tensile strength is 848 p.s.i. and the porosity is 37 Gurley seconds. These results are to be contrasted to Example 1 values of 510 seconds formation (filtration) time, 440 p.s.i. tensile strength and 52.3 Gurley seconds when pH adjustment is not employed.

A still further improvement in formation time, porosity and strength is obtained with sols prepared as in Example 1 but which are deionized to remove acid anions. The sol is gelled with concentrated ammonium hydroxide to a pH of about 9-10, washed with distilled water adjusted to pH 9-10 with ammonium hydroxide, and rewashed with distilled water. The resulting ratio of Al:Cl is 250:1. The sol is used in the preparation of glass fiber paper from suspensions of the latter to which sodium metaphosphate has been added followed by adjustment of pH to 3 exactly as described above. The final sheet has a formation time of 17 seconds, a tensile strength of 865 p.s.i., and a porosity of 15 Gurley seconds. The density of the sheet is 0.29 g./cc. and thickness was 8 mils.

A sheet of glass fiber paper prepared from a similar suspension using the acid pH adjustment but without fibrous boehmite has a filtration time of 15 seconds. The sheet has a thickness of 7 mils and a density of 0.30 g./cc. The porosity is 1 Gurley second and the tensile strength 149 p.s.i.

Example 3

An inorganic paper is made up containing 1.5 parts by weight of glass fibers of the type shown in Example 1, 0.5 part by weight of No. 2 Grade chrysotile asbestos dispersed with 0.002 mol $AlCl_3$ per gram of asbestos and 0.4 part by weight of $Al_2O_3$ as fibrous boehmite sol of the type shown in Example 1. When an aqueous suspension of these compounds is formed in a conventional fashion into a sheet on a wire screen the tensile strength is found to be 447 p.s.i. The porosity is 469 Gurley seconds.

A similar sheet containing glass fibers and chrysotile asbestos, but not containing fibrous boehmite, is too fragile to handle without tearing. The tensile strength of a small piece is 56.6 p.s.i. with a porosity of 9.3 Gurley seconds.

A similar suspension containing glass, asbestos and fibrous boehmite is prepared using dilute sulfuric to adjust the pH to 3.0. The sheet is formed with pH adjustment to 3 prior to sheet formation. Porosity was 161 Gurley seconds and tensile strength is 762 p.s.i.

Example 4

A glass fiber paper is made in a conventional manner using a commercial fine glass wool (Owens-Corning AAA Superfine Fibers). The product has an average diameter of about 0.6 micron and a range of diameters of about 0.07 to 1.0 micron. Two and one-half parts by weight of the glass wool are slurried in water to make a suspension containing 1% by weight of the glass fiber. This is agitated vigorously for 15 seconds and 0.67 part by weight of fibrous boehmite computed as $Al_2O_3$ is added as an aquasol containing 2% $Al_2O_3$. The fibrous boehmite aquasol has a specific surface area of 200 m.$^2$/g. and is prepared by autoclaving basic aluminum chloride solution 2% $Al_2O_3$ for 16 hours at 160° C.

Along with the fibrous boehmite alumina sol 0.33 part by weight of $SiO_2$ is added as a freshly prepared, low molecular weight silica sol. This sol is prepared by deionizing sodium silicate which has a weight ratio of $SiO_2:Na_2O$ of 3.25:1. The sol is practically free of sodium and contains about 3.0 percent $SiO_2$ by weight.

The final pH of the mixture of fibrous boehmite silica and glass fiber after agitation for another 30 seconds is 3.7. The mixture is formed into a sheet by filtering on a wire screen in conventional manner. The sheet is found to be strong and fairly flexible. It is found to have a much higher wet strength, that is after immersion in water for several hours, than a paper sheet which is similar but which does not contain the silica.

A similar paper is made using glass wool, fibrillated Thetford Asbestos No. 2 Grade together with a small amount of aluminum chloride as a dispersing agent. To this is added fibrous boehmite and a silica sol which has been prepared as in the preceding example by ion exchange. Sheets prepared using this slurry have greater wet strength than similar sheets not containing the silica. This is repeated using JM chrysotile asbestos No. 2 Grade. Then, again a paper is obtained which is much improved over that which uses only glass wool and asbestos.

*Example 5*

A wood pulp made of spruce wood is used which is made by the so-called kraft or sulfate process. This is the type of wood pulp used for making unbleached kraft paper. The pulp is beaten to a 775 Schopper-Riegler freeness. The suspension contains 2% of fibers by weight. To this slurry there is added ½% by weight of $Al_2O_3$ as an aqueous fibrous boehmite sol. The sol used has a surface area of 289 sq. meters per gram and the fibrils have a diameter of about 5 millimicrons and a length of about 1 micron.

The slurry is agitated and is formed into a sheet by gravity filtration. The sheet has a tensile strength of 19.8 pounds per inch of width of paper.

*Example 6*

To an aqueous slurry of unbleached kraft pulp previously beaten to a 775 Schopper-Riegler freeness, there is added an aquasol of fibrous boehmite. This sol has a surface area of 300 sq. meters per gram. The fibrils in the sol have a diameter of about 5 millimicrons and a length of about 1 micron.

To the slurry there is also added rosin. Using 1% of rosin based upon the dry fiber weight and 0.05% of fibrous boehmite sol computed as alumina $Al_2O_3$ and based upon the dry fiber weight, a Cobb size value is obtained of 41. With 0.2% of alumina the Cobb size value is 34. With 0.5% of alumina the value is 27.5.

An unbleached kraft paper is made in a similar fashion but using 1.25% of alum based upon the dry fiber weight and the Cobb size value is 31.

*Example 7*

To a slurry of 2.5 parts by weight of the "Vitron" 106 glass fibers described in Example 1 are added 6 parts of a 10% solution of sodium hexametaphosphate (unadjusted "Calgon"), and the mixture is rapidly agitated for 60 seconds. A few drops of dilute $H_2SO_4$ are then added to lower the pH of the mixture to 3.0.

A fibrous boehmite sol is prepared by stirring 10% by weight of a redispersible fibrous boehmite powder to distilled water. The boehmite powder is made by spray drying a sol according to the method of copending application Serial No. 730,026. The original sol which is spray dried is obtained by the process of copending application, Serial No. 619,794. The dispersible boehmite powder analyzed 69.93% $Al_2O_3$ and has 10.31% acetate radical (expressed as acetic acid) remaining in the product. The powder has a specific surface area of 293 m.²/g. and the fibers are roughly 225 millimicrons in length.

Eleven parts of the above redispersed fibrous boehmite sol are added to the glass fiber slurry. The mixture is again agitated rapidly for 60 seconds and adjusted to pH 3.0 by adding a few drops of dilute $H_2SO_4$.

The fiber suspension is added to water adjusted to pH 3.0 in the laboratory sheet machine as described in Example 1. A glass paper sheet weighing about 1.7 grams is formed on a conventional screen in about 30 minutes at atmospheric pressure. The paper which is about 5 mils in thickness is then heated for 40 minutes at 240° C. The tensile strength is then 626 p.s.i. and the porosity 88 Gurley seconds.

*Example 8*

A conducting graphite-containing fiber glass paper is prepared in the following manner: Two and one-half parts of "Vitron" 106 glass microfibers are suspended in 490 parts of water. One part of a 10% solution of sodium hexametaphosphate is added, and the mixture is agitated for one minute. To this mixture is then added with stirring 14.8 parts of an "Aquadag" colloidal graphite dispersion (22% solids) made by Acheson Colloid Company, followed by 7.2 parts of 10% fibrous boehmite sol prepared by adding distilled water to the dispersible, spray-dried boehmite described in Example 7. The resulting glass/graphite/boehmite mixture is then adjusted to pH 3.0 with a few drops of 10% $H_2SO_4$ and agitated another minute.

The composition obtained is pasty in consistency. It is diluted in the headbox of a Noble and Woods laboratory sheet machine with water previously adjusted to pH 3.0. A sheet is formed using a paper making wire screen, the formation time being about 6–8 minutes. The thickness of the paper obtained is about 10 mils. Its electrical resistance measured across a four-inch span between electrode probes is 42 ohms.

A second sheet is prepared in similar fashion except that addition of the fibrous boehmite sol is omitted. The formation time of the paper in this case is about two minutes and the electrical resistance across a 4-inch span is 104 ohms.

*Example 9*

Twelve parts of a bleached spruce kraft pulp with a Schopper-Riegler freeness of 545 and containing 25% dry cellulose are mixed into 480 parts of water. Five parts of a 10% boehmite sol prepared by redispersing spray-dried fibrous boehmite as in Example 7 are then added along with 19 parts of "Aquadag" colloidal graphite. The mixture is adjusted to pH 7.0 and agitated.

A paper sheet is then formed in the Noble and Woods laboratory sheet machine using a conventional paper screen. The formation time of the sheet is 9½ minutes, the tensile strength of the resulting paper is 1962 p.s.i., and the paper has an electrical resistance of 120 ohms across a 4-inch span between ohmmeter electrodes. The "white" water obtained during formation of this sheet contains some graphite, but the graphite flocculates and rapidly settles out.

A similar sheet prepared containing the bleached spruce kraft pulp and graphite but not boehmite forms within 30 seconds. The paper sheet has a tensile strength of 1750 p.s.i. and an electrical resistance of 700 ohms across a 4-inch span of paper. The "white" water which collects during formation of this sheet contains considerable graphite, most of which remains in colloidal dispersion.

*Example 10*

Three and one-half parts of fibrous potassium titanate prepared as in U.S. Patent 2,841,470 are stirred into 1000 parts of water. To this dispersion is added 3.5 parts of a fibrous boehmite sol containing 10% solids as described in Example 7. The mixture is brought to pH 3.0 with a few drops of 10% $H_2SO_4$ and then further diluted by mixing with water at pH 3.0 in the head box of the Noble and Woods laboratory sheet machine. A hand sheet is prepared using a conventional wire screen. The formation time is 36 seconds, and the paper is about 12 mils thick. It has a tensile strength of 105 p.s.i.

A similar paper prepared without adding fibrous boehmite forms in 17 seconds. This sheet is so delicate that it cannot be handled without tearing, having a tensile strength of only 10–15 p.s.i.

*Example 11*

A sample of a commercial organic-bonded fiber glass paper, 20 mils in thickness, made by the Hurlbut Paper Company, is partially dipped in a sol containing 2% fibrous boehmite. This sol is prepared by stirring the spray-dried, redispersible fibrous boehmite described in Example 7 in enough water to give the desired 2% concentration of fibrous boehmite. After drying, the glass paper so dipped is noticeably stiffer than the untreated portion. If now the paper is heated at 700° F. in an oven, the organic binder is volatilized. The portion of the paper dipped in boehmite retains its strength after such heating while the undipped paper becomes very fragile.

This strengthening by dipping in boehmite sol is also apparent for papers made from other fibers. For instance, dipping in fibrous boehmite sols is found to stiffen and strengthen paper containing mixtures of glass and cellulose fibers. Papers, mats or other felt-like products made from silica fibers such as "Refrasil" by the H. I. Thompson Company, aluminum silicate fibers, such as "Fiberfrax" by the Carborundum Company and instulating fibers made from kaolin clay, such as "Kaowool" by the Babcock and Wilcox Company are also improved by fibrous boehmite bonding.

*Example 12*

An insulation batt or filter mat bonded with fibrous boehmite is prepared in the following fashion: Thirty-nine parts of a spray-dried, dispersible fibrous boehmite powder of Example 7 are stirred into 561 parts of water until a translucent sol is obtained. Twelve parts of Owens-Corning HT rotary glass fiber (approx. 0.0005 inch in diameter) is added to the sol and is beaten in a Herman disintegrator for 20 to 30 minutes. The suspension is then transferred to the head box of a Noble and Wood laboratory paper sheet machine. An insulation block is formed on a standard paper wire screen by pulling vacuum through the box to remove excess fluid from the glass fibers. The batt so obtained is dried for at least 8 hours at 180° C.

The batt which results after drying has approximately 36% fibrous boehmite based on the total batt weight and a density of 5.7 pounds per cubic foot. Sections of the batt (2" wide x 6" long) are then tested by measuring the force required to break the batt in flexure. A force of 12 to 13 pounds is required to break the boehmite bonded batt.

A similar batt prepared in identical manner but adding the glass fiber to water instead of the boehmite sol is very fragile. The bulk density of the unbonded batt is about 3.2 pounds per cubic foot, and the batt is so weak that it cannot be evaluated by the standard flexural strength test.

*Example 13*

A 3-mil thick sample of a commercial inorganic-bonded asbestos paper sold under the name of "Quinterra" by Johns-Manville is dipped in a 2% fibrous boehmite sol, prepared as in Example 1. The paper is dried, then heat cured for one hour at 350° C. The paper so treated is considerably stiffened and has a dry tensile strength of 2200 p.s.i. The tensile strength of a similar untreated paper is 500 p.s.i.

*Example 14*

Two hundred and fifty parts of distilled water are added to 1.6 parts of Johns-Manville No. 2 asbestos, and the slurry is vigorously agitated for 5 minutes. Sixteen parts of a fibrous boehmite sol, as described in Example 1, but containing 3% $Al_2O_3$, is then added. The asbestos/boehmite/water composition is again vigorously agitated five minutes. In order to remove suspended iron particles, the mixture is then slowly stirred with an agitator to which magnets are fastened. Finally sulfate impurities are removed by the addition of 3.3 parts of a 1% solution of barium acetate.

A paper sheet is then prepared by pouring the composition into an 8" x 8" stainless steel pan and drying by evaporation at room temperature in a current of air. After drying, the paper sheet is peeled from the pan surface. The sheet is about 4 mils thick, has a porosity of greater than 6000 Gurley seconds, a dry tensile strength of 3160 p.s.i., a stiffness as measured by a Taber stiffness tester of 2.4, and a tear strength as measured by a Junior Elmendorff tear tester of 40 grams per centimeter.

*Example 15*

A swatch of carded, cross-lapped, type 42 "Orlon" acrylic fiber 3 denier per filament stable 2.5 inches long is compressed slightly between two wire mesh screens and then soaked in a 30 aqueous sol of the dispersible fibrous boehmite product described in Example 7, and then dried for 10 minutes at 105° C. The bonded fiber mat so obtained is considerably stiffer and much stronger than the original swatch or one similarly compressed and simply dipped in water and then dried. The dry cohesion between the fibers is increased several fold. After a further bake for 30 minutes at 150° C. the bonded mat has good water resistance, retaining most of its original strength after soaking in water for two hours.

*Example 16*

A fibrous boehmite aquasol is prepared as described in Example 1. To a 1% suspension of aluminosilicate fibers (Fiberfrax) is added a small quantity of sodium hexametaphosphate ("Calgon"), and the mixture is rapidly agitated for about 60 seconds. The pH of the mix is then reduced to 3 with dilute sulfuric acid and sufficient fibrous boehmite alumina sol of the type mentioned above added to give 0.2 part by weight $Al_2O_3$ based upon the amount of glass fibers. The mixture is again rapidly agitated for 60 seconds. The suspension thus prepared contains 10 parts by weight of Fiberfrax, 990 parts by weight of water, 0.2 part of sodium hexametaphosphate, 2 parts by weight of $Al_2O_3$ as fibous boehmite, and sufficient dilute sulfuric acid for pH adjustment.

The fiber suspension is added to the headbox of a Noble and Wood laboratory sheet machine, the water in the headbox having been adjusted previously to pH of 3 with dilute sulfuric acid. The fibers are formed on a conventional screen into a paper sheet weighing about 2.5 grams. The fibrous boehmite bonded "Fiberfrax" paper so formed is much superior in tensile and tear strength to one made in the same manner but without the alumina binder.

*Example 17*

A fibrous boehmite aquasol is prepared as described in Example 1. To a 1% suspension of rock wool which has been freed of slags, and other coarse material by settling is added a small quantity of sodium hexametaphosphate ("Calgon"), and the mixture is rapidly agitated for about 60 seconds. The pH of the mix is then reduced to 3 with dilute sulfuric acid and sufficient fibrous boehmite alumina sol of the type mentioned above added to give 0.2 part by weight of $Al_2O_3$ based upon the amount of glass fibers. The mixture is again rapidly agitated for 60 seconds. The suspension thus prepared contains 10 parts by weight of rock wool, 990 parts by weight of water, 0.2 part by weight of sodium hexametaphosphate, 2 parts by weight of $Al_2O_3$ as fibrous boehmite and sufficient dilute sulfuric acid for pH adjustment.

The fiber suspension is added to the headbox of a Noble and Wood laboratory sheet machine, the water in the headbox having adjusted previously to a pH of 3 with dilute sulfuric acid. The resulting rock wool paper has a much higher tear and tensile strength compared to rock wool paper prepared by conventional means without the fibrous boehmite binder.

The claims are:

1. A felted product containing at least one weight percent of fibers and from 1 to 99 weight percent of fibrous boehmite.

2. A felted product containing at least one weight percent of fibers bonded into such felted product with from 1 to 99 weight percent of fibrous boehmite based on the total weight of felted product.

3. A felted product containing at least 5 weight percent of inorganic fibers bonded into such felted product with from 1 to 95 weight percent fibrous boehmite based on the total weight of felted product.

4. A felted product containing at least 5 weight percent of inorganic fibers selected from the group consisting of siliceous, titaniferous and aluminiferous fibers, said fibers being bonded into such felted product with from 1 to 95 weight percent of fibrous boehmite based on the total weight of felted product.

5. A felted product containing at least 5 weight percent of siliceous fibers, said fibers being bonded into such felted product with from 1 to 95 weight percent of fibrous boehmite based on the total weight of felted product.

6. A felted product containing at least 5 weight percent of glass fibers, said fibers being bonded into such felted product with from 1 to 95 weight percent of fibrous boehmite based on the total weight of felted product.

7. A felted product containing at least 5 weight percent of aluminosilicate fibers, said fibers being bonded into such felted product with from 1 to 95 weight percent of fibrous boehmite based on the total weight of felted product.

8. A felted product containing at least 5 weight percent of asbestos, said fibers being bonded into such felted product with from 1 to 95 weight percent of fibrous boehmite based on the total weight of felted product.

9. A felted product containing at least 5 weight percent of rock wool, said fibers being bonded into such felted product with from 1 to 95 weight percent of fibrous boehmite based on the total weight of felted product.

10. A felted product containing at least 5 weight percent of potassium titanate fibers, said fibers being bonded into such felted product with from 1 to 95 weight percent of fibrous boehmite based on the total weight of felted product.

11. A felted product containing at least 5 weight percent of organic fibers bonded into such felted product with from 1 to 95 weight percent fibrous boehmite based on the total weight of felted product.

12. A felted product containing at least 5 weight percent of cellulosic fibers, said fibers being bonded into such felted product with from 1 to 95 weight percent of fibrous boehmite based on the total weight of felted product.

13. A felted product containing at least 5 weight percent of acrylic fibers, said fibers being bonded into such felted product with from 1 to 95 weight percent fibrous boehmite based on the total weight of felted product.

14. A felted product containing at least 1 percent of fibers and not more than 50 weight percent of colloidal silica, said fibers and said colloidal silica being bonded into such felted product using from 1 to 99 weight percent of fibrous boehmite based on the total weight of the felted product.

15. A felted product made of glass fibers and containing from 5 to 50 weight percent of fibrous alumina monohydrate having a boehmite crystal lattice, the alumina fibers having an axial ratio of at least 10:1.

16. A felted product made of glass fibers and sized with from 0.5 to 25 weight percent of fibrous alumina monohydrate having a boehmite crystal lattice, the alumina fibers having an axial ratio of at least 10:1.

17. In a process for the preparation of a felted product from an aqueous slurry containing at least 1 percent of fibers, the steps of mixing from 1 to 99 weight percent fibrous boehmite with such slurry and thereafter forming the resulting slurry into a felted product.

18. In a process for forming a felted product containing at least one weight percent of cellulosic fibers from an aqueous slurry of such fibers, the step of mixing from 1 to 99 weight percent of fibrous boehmite with such slurry and thereafter forming the resulting slurry into the felted product.

19. In a process for forming a felted product containing at least one weight percent of siliceous fibers from an aqueous slurry of such fibers, the step of mixing from 1 to 99 weight percent of fibrous boehmite with such slurry and thereafter forming the resulting slurry into the felted product.

20. In a process for making a felted product from an aqueous slurry containing at least 1 weight percent of fibers, the step of mixing with the slurry at least 1 weight percent of fibrous boehmite and not more than about 50 weight percent of colloidal silica.

References Cited in the file of this patent

UNITED STATES PATENTS

| | | |
|---|---|---|
| 2,266,637 | Houser | Dec. 16, 1941 |
| 2,334,572 | Melton | Nov. 16, 1943 |
| 2,377,547 | Fuchs | June 5, 1945 |

OTHER REFERENCES

Extractive Metallurgy of Aluminum by Sherwin, p. 661, Transactions AIME, vol. 188, April 1950, Journal of Metals.

Textbook of Mineralogy, by Dana, 4th ed. (1932), pp. 502–503, pub. by John Wiley & Sons (N.Y.).

Dicalte, Bulletin F-50, pp. 1-8, published by Dicalte Co., 120 Wall St., N.Y.